UNITED STATES PATENT OFFICE.

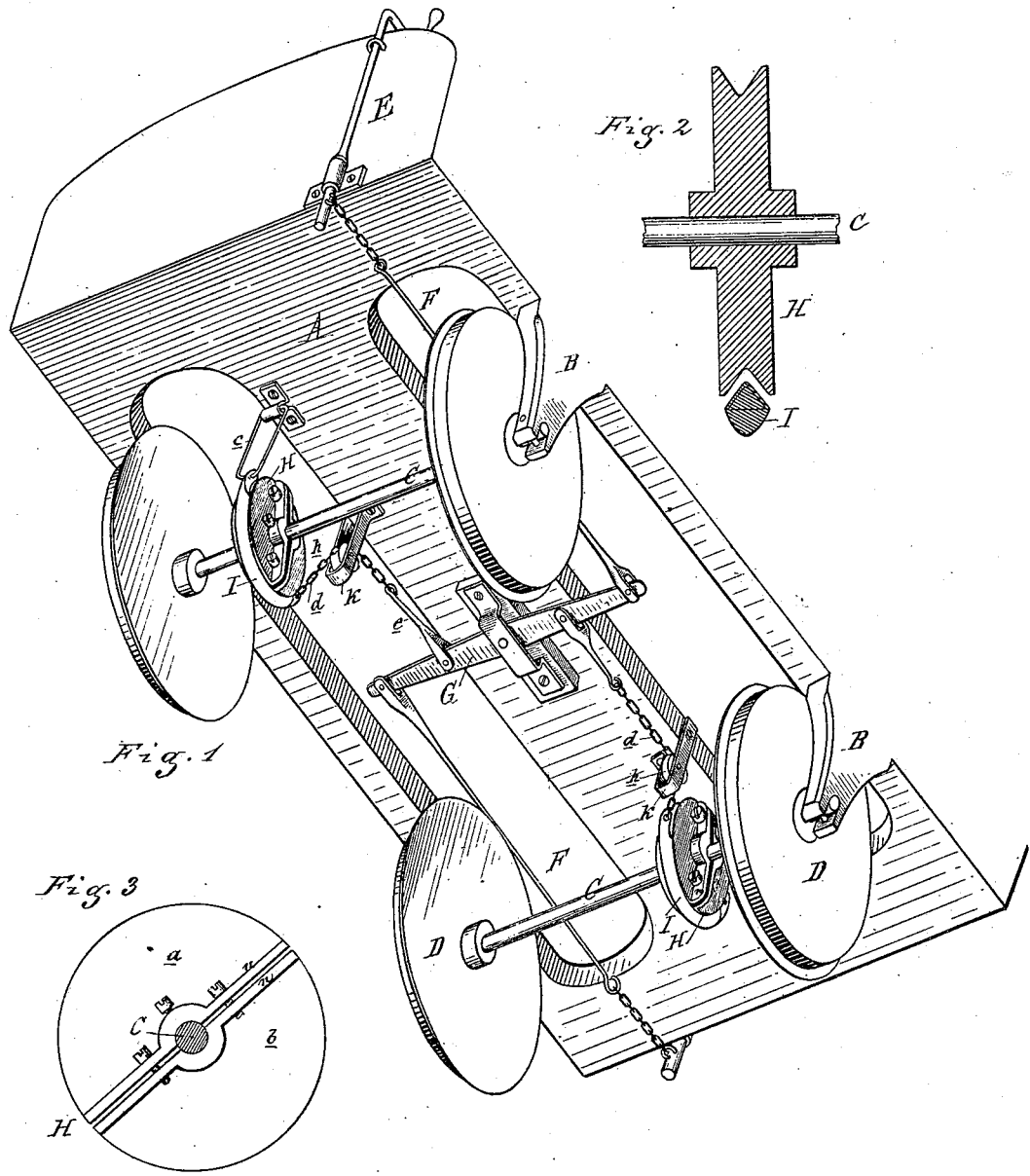

GEORGE COLLINS AND JOSEPH LONGTON, OF DETROIT, MICHIGAN.

CAR-BRAKE.

SPECIFICATION forming part of Letters Patent No. 227,218, dated May 4, 1880.

Application filed March 3, 1880. (Model.)

*To all whom it may concern:*

Be it known that we, GEORGE COLLINS and JOSEPH LONGTON, both of Detroit, Wayne county, Michigan, have invented an Improvement in Car-Brakes, of which the following is a specification.

The nature of this invention relates to new and useful improvements in brakes equally as well adapted for horse or steam railway-cars as for machinery-shafting.

The invention consists in the peculiar and novel construction, combination, and operation of the parts, as more fully hereinafter described.

In the drawings, Figure 1 is a perspective view, looking upward toward the bottom of a horse-railway car with our improved brakes attached. Fig. 2 is a vertical central section, on the line of the axle, of the grooved wheel and shoe. Fig. 3 is a plan view of one of the grooved wheels detached.

In the accompanying drawings, which form a part of this specification, A represents the bottom of a car; B, the pedestals; C, the axles; D, the wheels; E, the brake-staffs; F, the connections between the brake-staffs and the centrally-pivoted lever G, all being of the usual construction.

H represents a pulley having a wedge-shaped groove on its periphery, one of which pulleys is secured to each axle, as shown. This pulley is cast in two pieces, *a b*, and provided with flanges *n*, by means of which and suitable bolts the two parts are secured together upon the axle, thereby preventing the necessity of removing one of the wheels in order to locate the grooved pulley upon the axle.

The parts *a b*, when embracing the axle, will not quite meet, and the action of the bolts compels the two parts to grasp the axle and be rigidly held in place therein without the necessity of being keyed.

A shoe, I, forming a segment of a circle, and of wedge form to fit the groove in the pulley, is secured to the floor of the car by means of the link *c*. The opposite end of the shoe is secured to a chain, *d*, which, in turn, is secured directly or by a rod, *e*, to the lever G.

One of these pulleys, with the attachments just described, being arranged upon each axle, and both connected to the centrally-pivoted lever, enables the operator, from either end of the car, by rotating the brake-staff, to set the brake simultaneously upon each axle.

The chain-connections *d* between the shoe and the centrally-pivoted lever pass over pulleys *h*, journaled in yokes or hangers *k*, secured to and pendent from the bottom of the car.

It will be perceived that the shoe I is wedge-shaped in cross-section, to fit into the correspondingly-formed groove in the wheel H, so that a binding action of the shoe in the wedge-shaped groove in the wheel H is produced, in addition to the friction produced when the brake is applied to the wheel.

It will also be observed that the shoe I has the form of a large arc of a circle, embracing the wheel H on each side of the axle, and that when the brake is operated the axle is lifted in its bearings in the pedestals B, creating additional friction between the journals of the axle and its bearings in the pedestals.

What we claim as our invention is—

The combination, with the car-axles C and wheels D, of the brake-staffs E, centrally-pivoted lever G, pulleys H, each having a wedge-shaped groove in its periphery, segmental shoe I, wedge-shaped in cross-section, pivoted link *c*, chains *d*, rods *e*, pulleys *h*, and hangers *k*, all constructed and arranged to operate in the manner and for the purpose set forth.

GEORGE COLLINS.
JOSEPH LONGTON.

Witnesses:
H. S. SPRAGUE,
A. BARTHEL.